Patented Oct. 2, 1928.

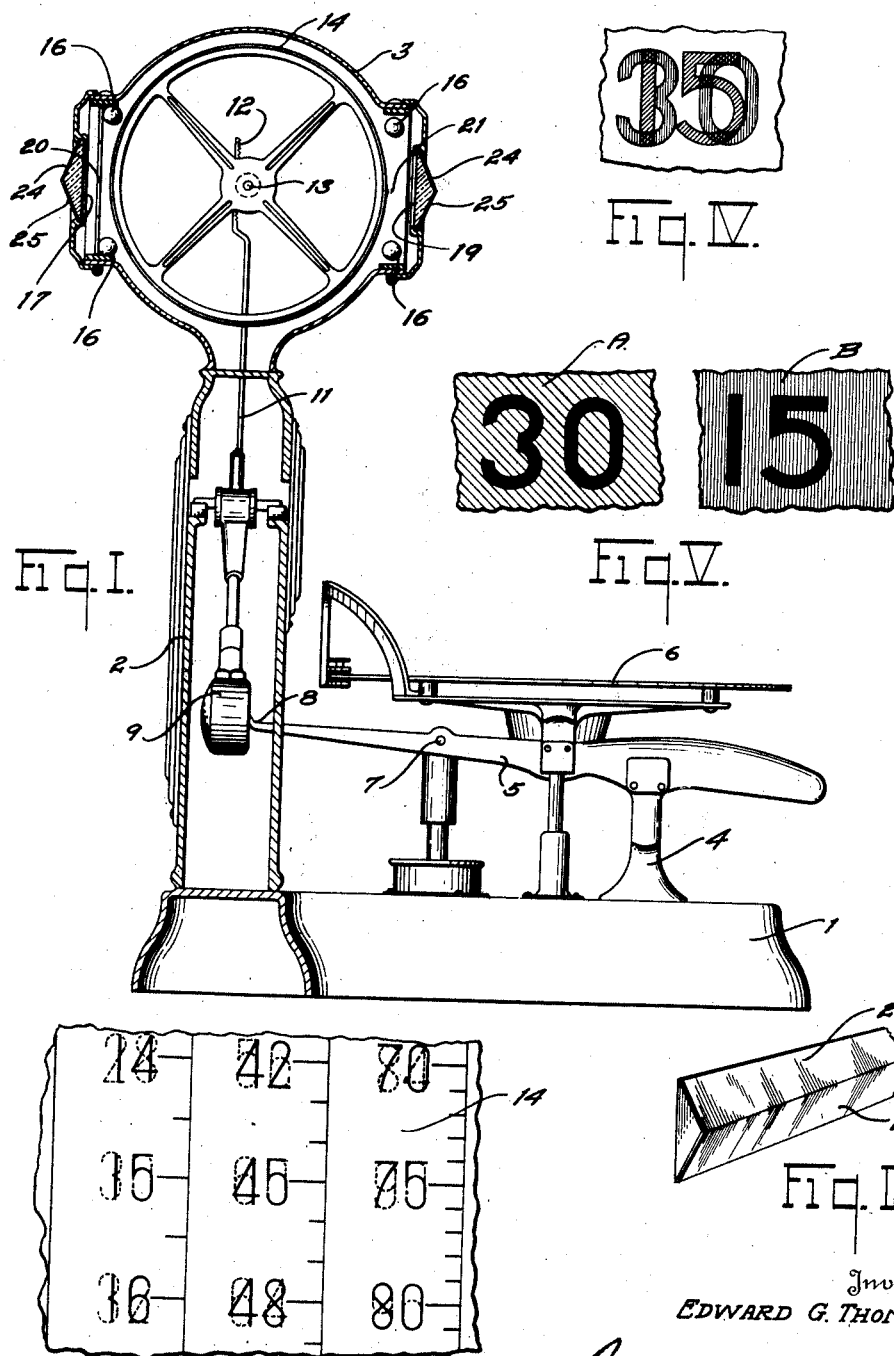

1,685,790

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed September 13, 1924. Serial No. 737,598.

This invention relates to weighing scales, and particularly to scales of the automatic type.

One of its principal objects is to provide means for increasing the number of computations that may be indicated by scales of this type without increasing the dimensions of the indicating mechanism or decreasing the size of the numerals or the spaces therebetween.

Another object is the provision of an indicating chart having a plurality of sets of optically dissimilar characters of different values, and means for selecting one of said sets as occasion requires.

Another object is the provision of means for increasing the indicating capacity of charts such as are employed in automatic scales of the cylinder type.

Still another object is the provision of means whereby the indicating capacity of a chart may be increased without involving manual adjustments of the scale.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a side elevational view, partly in section, of a weighing scale known as the cylinder type;

Figure II is a detail view of a prism comprising one element of my invention;

Figure III is a diagram of a portion of the chart showing the positions of the characters and graduations;

Figure IV is a representation of the appearance of a portion of the chart as viewed without a screen; and Figure V represents the appearance of the portion of the chart shown in Figure IV as viewed through screens of different colors.

It is to be understood that the scale shown in the drawings and described herein is merely an exemplary embodiment of my invention, which is also adapted for embodiment in scales having other types of indicating charts and other types of load-offsetting mechanism.

The scale embodying my invention comprises a base 1 upon one end of which is supported an upright housing 2 of substantially watch-case shape surmounted by a cylindrical casing 3. Supported upon the base 1 is a base horn 4 which forms a fulcrum stand for the main lever 5 of the scale. This lever supports a platter or commodity-receiver 6 and is connected, as at 7, to the plunger of a dash pot which serves to damp the vibration of the weighing mechanism. A load-offsetting pendulum 9 is pivotally supported within the casing 2 and is operatively connected to the nose 8 of the lever 5. The nose end 8 of the lever is also connected to an upwardly extending rod 11, the upper portion terminating in a toothed rack 12 meshing with a pinion (not shown) fixed to the axial shaft 13 of the cylindrical chart 14. Located within the casing 3 in position to illuminate the chart is a plurality of electric lamps 16 which are controlled by a switch (not shown) which is normally held open by the pendulum.

When a load is placed upon the platter 6, the lever 5 is forced downwardly; the nose 8 being connected to the pendulum, the pendulum is swung upwardly to a position offsetting the load. Simultaneous with the movement of the lever and pendulum, the rack rod 11 is moved downwardly, thereby rotating the chart 14 to display a weight indication through a window 17 in the rear side of the casing 3 and to display weight and value indications through a window 19 in the front side of the casing 3. In order that the weights and values on the chart may be accurately read, the chart is divided into columns and each column is suitably graduated by means of horizontal lines to be brought by rotation of the chart into proximate registration with hair line indicating wires 20 and 21 stretched horizontally between the cylindrical chart 14 and the windows 17 and 19. The graduations are marked with appropriate numerals designating the weights and values indicated when the respective graduations are brought into registration with the reading wires.

For the purpose of increasing the range of the chart, I print thereon two sets of characters of different colors, for example, green and red, and provide means whereby each set of characters may be selectively visible to the operator without manipulation of mechanism, such means preferably being in the forms of colored screens so arranged that the chart may be viewed through them. To this end I have therefore constructed the glazed portions 17 and 19 in the form of prisms having cross sections substantially of the form of an isosceles triangle, two of the faces or planes of the prisms bearing sheets of transparent material 24 and 25, such as glass or celluloid, of contrasting colors, as green and red respectively, corresponding to the colors of the characters on the chart. If a person views the characters on the chart through the green color screen 24 fixed to the prism, the green component of light reflected from the unprinted portion of the chart surface and the green light from the green characters pass through the screen, substantially all other light reflected from the chart surface being absorbed. Since there is no observable difference in color between the unprinted portion of the chart and the green characters as viewed through the green screen, the green characters are indistinguishable. Since only red light is reflected from the red characters on the chart, none of the light from these characters passes through the green screen. The red characters, therefore, appear when viewed through the green screen to be black on a green background, as indicated at A in Figure V.

If the same portion of the chart is viewed through the red screen, which screen only transmits the red component of light from the unprinted portion of the chart surface, as well as the red light from the characters printed in red, the unprinted portion of the surface and the red characters will appear the same color. The red characters will, therefore, be indistinguishable, but the green characters appear to be black on a red background, as indicated at B in Figure V.

It is well known to anyone skilled in the art that the number of prices per pound which may be placed upon the chart is comparatively small and the columns must be of sufficient width to be easily readable at a reasonable distance from the chart. With the arrangement as hereinbefore described, it is possible to double the range of prices per pound and the corresponding values for the various weights within the capacity of the scale. This is accomplished by printing a double set of characters on a price bar corresponding to the two complete ranges of prices per pound, such, for example, as a price range of one cent to thirty-five cents and another range from thirty-six cents to seventy cents. When viewed through one color screen or filter the prices per pound of one price range are visible and when viewed through the other color screen the corresponding price range is visible.

From the foregoing description it will be apparent that a change in the price range may easily be accomplished by simply viewing the graduations on the chart through either of the color filter screens from substantially the same position of observation.

The embodiment of my invention herein shown and described is to be regarded as illustrative only, and it is to be understood that the invention is susceptible to variation, modification and change within the spirit and scope of the subjoined claims.

Having described my invention, I claim:

1. In a weighing scale, in combination, weighing mechanism, a chart co-operating therewith and having a plurality of sets of characters of different color characteristics, a plurality of fixed color filter screens co-operating with said chart for selectively rendering said sets of characters legible, and means whereby the same points on the chart are visible through either screen.

2. In a weighing scale, in combination, weighing mechanism, a chart co-operating therewith and having a plurality of sets of characters of different color characteristics and of unlike values, a plurality of fixed color filter screens for selectively rendering said sets of characters legible, and means whereby the same points on the chart are visible through either screen.

3. In a weighing scale, in combination, weighing mechanism, a chart co-operating therewith and having graduations and a plurality of characters of different color characteristics giving to said graduations unlike values, means including a pair of fixed color filters for rendering said graduations and selectively rendering one of said sets of characters readable, and means whereby the same points on the chart are visible through either screen from substantially the same position of observation.

4. In a weighing scale, in combination, weighing mechanism, a chart co-operating therewith and having black graduations and two different colored sets of characters giving to said graduations unlike values, a pair of different colored fixed transparent screens for selectively rendering the sets of characters readable, and means whereby the same points on the chart are visible through either screen from substantially the same position of observation.

5. In a weighing scale, in combination, weighing mechanism, a chart co-operating therewith and having a plurality of sets of characters of different color characteristics, and a prism having a plurality of transparent color filter portions of different color characteristics adjacent said chart and cooperating therewith for selectively rendering said sets of characters legible.

6. In a weighing scale, in combination, weighing mechanism, a chart co-operating therewith and having a plurality of sets of different colored characters, a prism adjacent said chart, and a plurality of color filter screens of different color characteristics adjacent certain faces of the prism for selectively viewing each of said sets of characters from the same side of the scale.

7. In a weighing scale, in combination, weighing mechanism, a chart co-operating therewith and having black graduations and two different colored sets of characters giving to said graduations unlike values, and a prism adjacent said chart having a plurality of color filter screens co-operating therewith whereby said sets of characters are selectively rendered legible when said chart is viewed through the various color screens.

8. In a weighing scale, in combination, weighing mechanism, a chart co-operating therewith and having a series of black graduations and a plurality of different colored sets of characters giving to said graduations unlike values, a prism adjacent said chart, and a plurality of color filter screens of different color characteristics adjacent certain faces of said prism.

EDWARD G. THOMAS.